United States Patent Office 2,983,236
Patented May 9, 1961

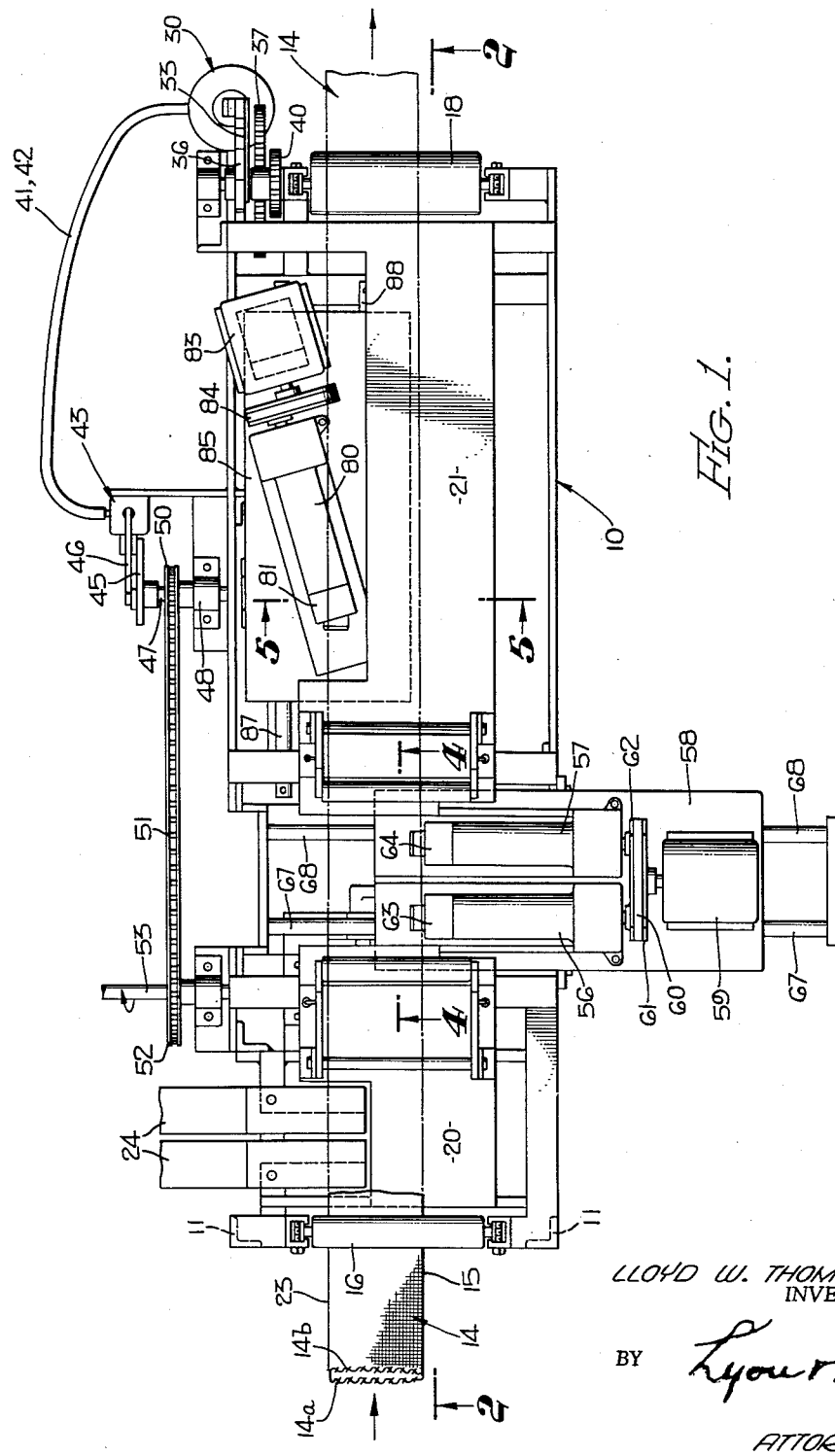

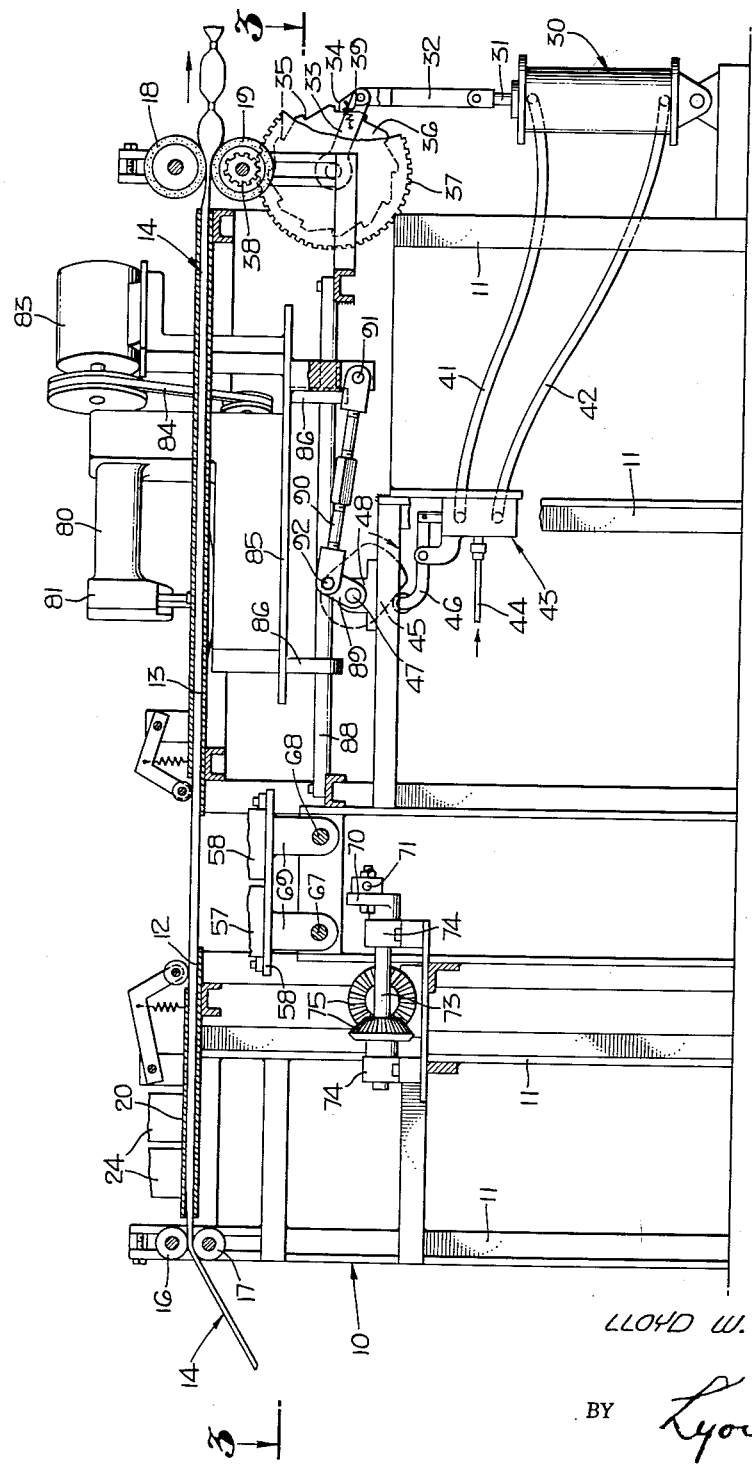

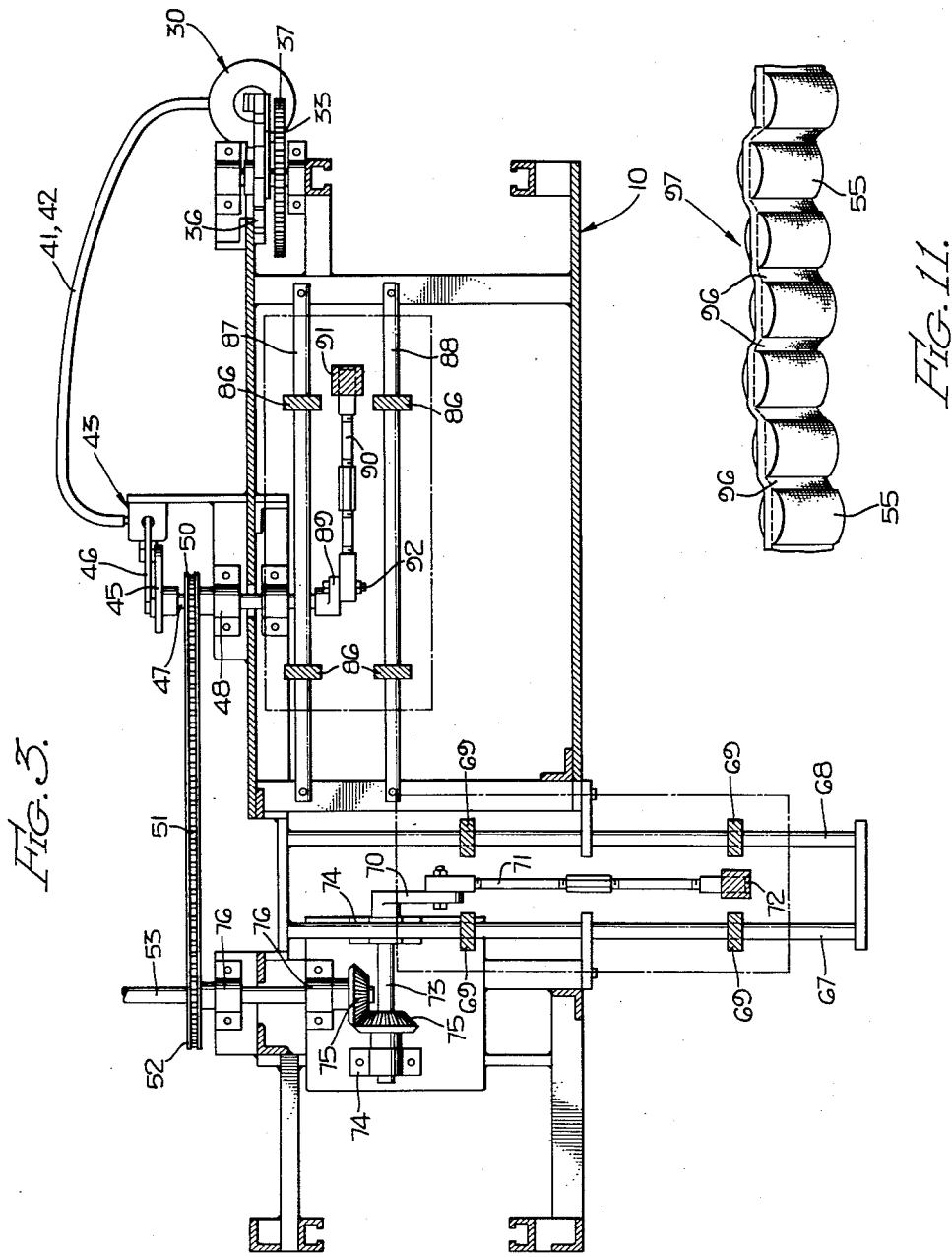

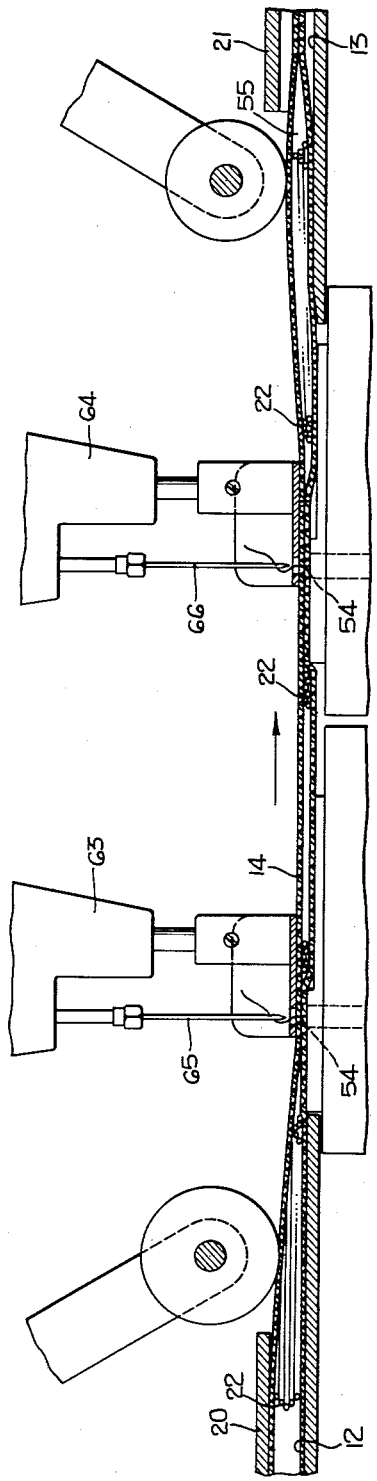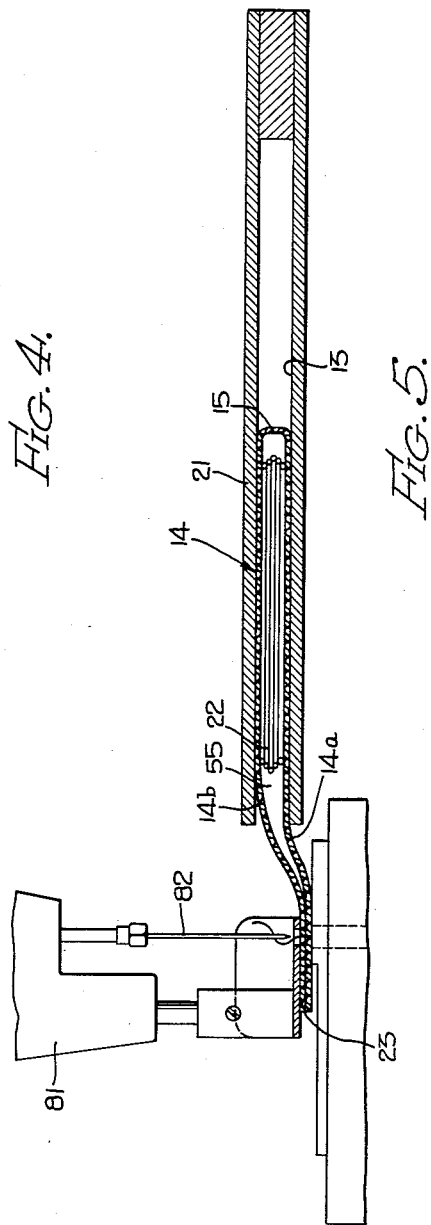

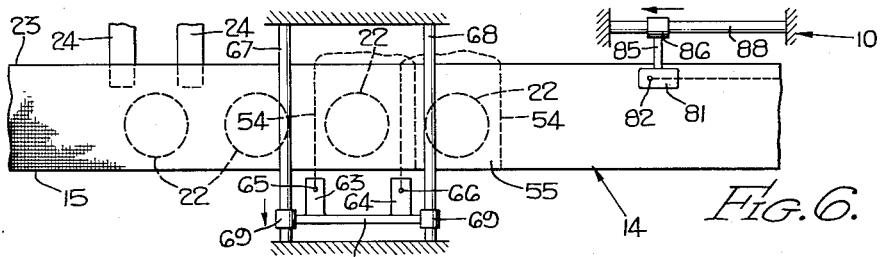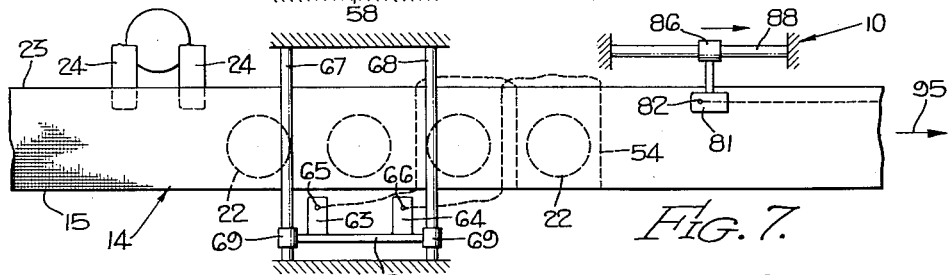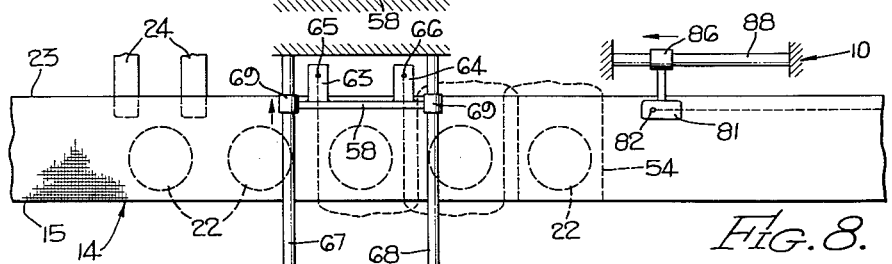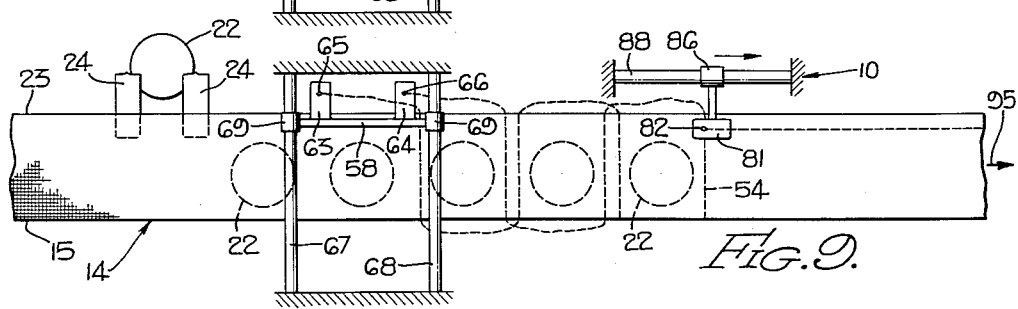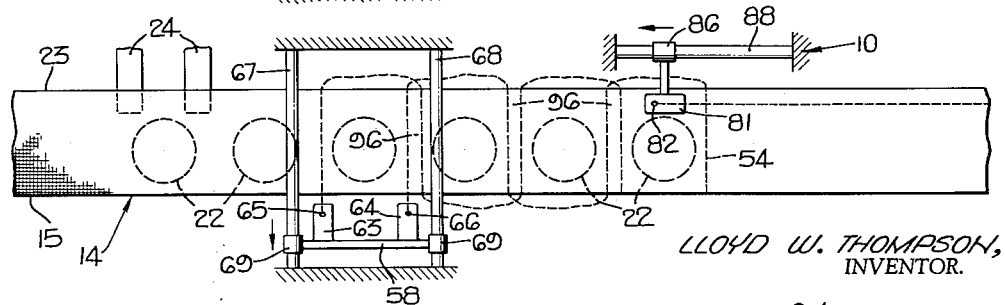

2,983,236

APPARATUS FOR MAKING LENGTHS OF FABRIC-POCKETED SPRING COILS

Lloyd W. Thompson, Inglewood, Calif., assignor to Marspring Corporation, Los Angeles, Calif., a corporation of California Filed Mar. 24, 1958, Ser. No. 723,396

9 Claims. (Cl. 112—2)

This invention relates to an apparatus for making lengths of fabric-pocketed spring coils to form mattresses or cushions of the so-called Marshall type. Continuous lengths of these pocket-encased coil springs are mounted side by side with the spring axes parallel to provide a cushion or mattress of the desired shape and size. The fabric-pocketed springs are formed as a continuous length by inserting compressed coil springs into the open side of a web of textile fabric formed of two fabric plies, one overlying the other, the plies being integrally connected together along one longitudinal edge. Parallel lines of stitching are formed on opposite sides of the compressed coil springs and extending transversely of the strip, and longitudinal stitching connects the open edges of the plies to complete the formation of the pockets around the coil springs. The springs are subsequently turned one-quarter revolution within their respective pockets so that the spring axes are parallel to the transverse lines of stitching.

Prior art machines have employed one sewing head to move transversely of the double ply web and another sewing head which is stationary with respect to the base of the machine. The double ply web is moved intermittently, the transverse sewing head operating while the web is stationary and the longitudinal sewing head operating when the web moves longitudinally. In such prior art devices, the maximum sewing speed in feet per minute of the longitudinal sewing head limited the rate of output of the machine, since the maximum speed of the web was governed by the maximum sewing speed of the longitudinal sewing head. In accordance with my invention, I provide an improved machine for producing fabric-pocketed springs and the maximum speed of operation is substantially double that of the maximum linear speed of the longitudinal sewing head. This is accomplished by reciprocating the longitudinal sewing head in the direction of movement of the web and in timed relation therewith so that the sewing head moves in the direction of travel of the web when the web is moving, and moves in the opposite direction when the web is stationary. The longitudinal sewing head operates continuously while the web operates intermittently. While the web is moving, the longitudinal sewing head is moving in the same direction but at approximately one half the speed. In this way, the relative speed of the longitudinal sewing head and the web is substantially one-half of the maximum linear speed of the web. Another feature of this invention lies in providing a machine for forming the pocketed fabric strip and providing separate boundary stitching for each of the pockets independent of the adjacent pockets. A pocketed strip of this type may be cut to any desired length by cutting the fabric between adjacent pockets and in this way, the coil springs on both sides of the severance line remain pocketed and do not escape from the fabric enclosure. Other and more detailed objects and advantages will appear hereinafter.

In the drawings:

Figure 1 is a top plan view showing a preferred embodiment of my invention.

Figure 2 is a side elevation partly in section taken along the lines 2—2 as shown in Figure 1.

Figure 3 is a sectional plan view taken substantially on the lines 3—3 as shown in Figure 2.

Figure 4 is a sectional elevation taken substantially on the lines 4—4 as shown in Figure 1.

Figure 5 is a transverse sectional view taken substantially on the lines 5—5 as shown in Figure 1.

Figures 6, 7, 8, 9 and 10 are plan views in diagrammatic form showing steps in the operating cycle of the machine.

Figure 11 is a perspective view showing the product produced by the machine, namely an elongated fabric-pocketed strip enclosing parallel coil springs.

Referring to the drawings, the base generally designated 10 includes a plurality of upright supporting posts 11 and a pair of spaced horizontal surfaces 12 and 13. A textile fabric 14 having two plies 14a and 14b integrally joined along the edge 15 passes through guide rollers 16 and 17 mounted on the base 10 and the web extends over the table surfaces 12 and 13 and between a pair of feed rollers 18 and 19 carried at the other end of the frame. The web 14 passes under the plate 20 above the table surface 12 and also passes under the plate 21 which is positioned above the table surface 13.

Means are provided for delivering axially compressed coil springs 22 to the web and inserting such compressed springs through the open edge 23 to a position between the plies 14a and 14b. Guide fingers 24 for inserting these compressed coil springs extend from conventional apparatus (not shown) which produces the springs from a coil of wire and compresses them to minimum overall height.

Means are provided for advancing the web 14 by intermittent motion and as shown in the drawings, this means includes an upright power cylinder assembly 30 which has a double acting piston rod 31 connected by link 32 to pivoted arm 33. The forward end 34 of the link 32 is shaped to engage the shoulders 35 formed on the ratchet 36. A gear 37 is connected to turn with the ratchet wheel 36 and this gear meshes with the driven gear 38 fixed to the feed roller 19. A spring 39 connects the forward end of the link 32, engages one of the shoulders 35 and turns the ratchet wheel 36 through a portion of one revolution. This turning motion of the ratchet wheel 36 causes the gears 37 and 38 to turn the feed roller 19 in a direction to advance the web 14 toward the right. The upper feed roller 18 is driven by gearing 40 from the lower feed roller 19.

The double acting power cylinder 30 is pneumatically operated through lines 41 and 42 connected to the valve assembly 43. Air under pressure admitted through pipe 44 is alternately admitted into one of the lines 41 and 42 and exhausted from the other. The exhaust port on the valve is not shown. The valve is actuated by means of a rotary cam 45 and pivoted follower 46. The cam 45 is fixed on the shaft 47 mounted in spaced bearings 48 carried on the frame. A sprocket 50 fixed on the shaft 47 is driven by chain 51 from the sprocket 52 fixed on the power shaft 53.

Means are provided for forming transverse stitch lines 54 across the web 14 to define the sides of the individual pockets 55 for the coil springs 22. As shown in the drawings, this means includes a pair of sewing machines 56 and 57 mounted on a single carrier 58 and power driven from an electric motor 59 through a belt 60 and pulleys 61 and 62. The sewing heads 63 and 64 of these machines are each provided with a vertically reciprocating needle 65 and 66, respectively. The sewing machines and heads are of conventional form and operate continuously. The spacing of the needles 65 and 66 in a direction longitudinally of the web 14 is less than the intermittent travel of the web as provided by the feed rollers 18 and 19.

A pair of horizontal parallel guide bars 67 and 68 are fixed on the frame and serve to support the carrier 58 for sliding movement in a direction transverse of the web 14. Legs 69 fixed to the carrier 58 are slidably mounted on the stationary rods 67 and 68. Reciprocation of the base 58 and sewing machines 56 and 57 relative to the base 10 is accomplished by means of a crank 70 acting through pitman 71, pivotally connected to the carrier 58 at 72. The crank 70 is fixed on the shaft 73 carried on bearing 74 mounted on frame 10. Miter gears 75 serve to drive the shaft 73 from the power shaft 53. The power shaft 53 is supported in spaced bearings 76 mounted on the frame 10. Rotation of the power shaft 53 therefore serves to reciprocate the sewing machines 56 and 57 in timed relation with the intermittent movement of the web 14 and this timing is such that the heads 63 and 64 cross the web transversely during the interval that it remains at rest. The stitch lines 54 formed by the needles 65 and 66 therefore extend straight and parallel across the web 14.

A longitudinal sewing machine 80 is provided with a sewing head 81 having a vertically reciprocating needle 82. Sewing machine 80 is similar to the machines 56 and 57 previously described. An electric motor 83 is connected by belt 84 to drive the sewing machine 80. The machine 80 and motor 83 are mounted on a longitudinally reciprocating carrier 85 having legs 86 mounted to slide on the parallel horizontal bars 87 and 88 fixed on the frame 10. The carrier 85, sewing machine 80 and motor 83 are reciprocated by means of a crank 89 and pitman 90. The pitman 90 is connected to the carrier 85 at 91 and is connected to the crank 89 and 92. The crank 89 is fixed on the shaft 47, previously described. Rotation of the shaft 47 causes the sewing machine 80 and motor 83 to reciprocate along the longitudinal guide bars 87 and 88. The effective length of the crank 89 is such that the length of travel of the sewing machine 80 is substantially one-half of the intermittent travel of the web 14.

The parts are constructed and arranged so that the longitudinal sewing head 81 moves in the same direction as the web 14 while the web is moving, but at substantially one-half the speed. The sewing head 81 moves in the other direction during the time interval that the web 14 is stationed there. Thus by reciprocating the longitudinal sewing head 81 in timed relationship with the intermittent advance of the web 14, I am able to reduce the maximum relative rate of linear movement between the web 14 and the sewing head 81.

In operation, power is supplied to the shaft 53 and air under pressure is supplied through pipe 44. A coil spring 22 is fed laterally into the space between the plies 14a and 14b, each time that the web comes to rest. The turning movement of the shaft 53 causes the feed rollers 18 and 19 to move the web by intermittent motion. The compressed coil springs are prevented from expanding to full height by means of the plates 20 and 21 and the coil springs 22 move with the web plies 14a and 14b.

As best shown in the diagrammatic illustrations of Figures 6-10 inclusive, the longitudinal sewing head 81 reciprocates relative to the base 10 but it moves continuously in one direction with respect to the web 14. The sewing heads 63 and 64 reciprocate transversely each time the web comes to rest. The lines of stitching 54 produced by the transverse sewing heads 63 and 64 form the side walls of the pockets for the coil springs 22. The stitches formed by the sewing head 81 cross the ends of the pockets.

Figure 6 shows the web 14 at rest with the sewing heads 63 and 64 fully retracted. The sewing head 81 has reached the forward extremity of its stroke relative to the base 10. Figure 7 shows the web 14 as it reaches the end of its travel in the direction of the arrow 95. The heads 63 and 64 remain on the same side as the web 14 but the head 18 has moved to the other end of its stroke with respect to the base 10.

Figure 8 shows the heads 63 and 64 in fully advanced position after forming parallel stitch lines across the web. The sewing head 81 is in the same position shown in Figure 6. Figure 9 shows the web 14 reaching the ends of its movement in the direction of the arrow 95 and shows the head 81 in the same position as Figure 7. The sewing heads 63 and 64 have not engaged the web 14 during the interval of its forward motion but remain in the advanced position. The "dwell" at the ends of the stroke of the heads 63 and 64 is a period of relatively little motion and is the result of the action of the crank 70 and pitman 71.

Figure 10 shows the part in the same position as Figure 6 and the cycle is ready to repeat.

It will be observed that a narrow space 96 is formed between adjacent pockets 55, because the spacing of the heads 63 and 64 is less than the incremental movement of the web 14. This space 96 makes it possible to sever the completed strip 97 at any desired location between adjacent pockets 54 without admitting any coil spring 22 to escape from its enclosing pocket.

It is possible to omit one of the sewing heads 63 or 64, and in this case, only a single transverse stitch line 54 is formed between adjacent coil springs 22. The finished strip which is produced is similar to that shown in Figure 11 except that the spaces 96 are omitted. In such case, severance of the strip to provide the desired number of coils results in loss of one of the coil springs adjacent the severance line.

Having fully described my invention, it is to be understood that I do not wish to be limited to the details set forth above, but my application is of the full scope of the appended claims.

I claim:

1. Apparatus for producing a line of stitches upon a textile fabric web, comprising in combination: intermittent feed means for moving the web longitudinally, a sewing head mounted for linear reciprocating movement longitudinally of the web and adapted to form a straight line of longitudinal stitches on the web, and means for moving the sewing head longitudinally of the web in one direction when the web is stationary and longitudinally in the opposite direction while the web is moving.

2. The apparatus set forth in claim 1 in which the length of the stroke of the reciprocating sewing head is substantially one-half of the length of the intermittent travel of the web.

3. Apparatus for producing a series of pockets in a textile fabric web formed of two fabric plies one overlying the other and connected along one longitudinal edge, comprising in combination: a base, intermittent feed means on the base for moving the web longitudinally, at least one sewing head mounted on the base for reciprocating movement transversely of the web and adapted to form lines of stitches defining sides of the pockets, a second sewing head mounted on the base for linear reciprocating movement longitudinally of the web and adapted to form a straight line of longitudinal stitches closing the ends of the pockets, and means on the base for moving the sewing heads in timed relation with respect to the intermittent movement of the web, said means acting to move the first said sewing head when the web is stationary, and to move the second sewing head in the direction of web movement when the web is moving and in the opposite direction when the web is stationary.

4. The apparatus set forth in claim 3 in which the stroke of the first said sewing head is greater than the width of the web, and in which the stroke of the second sewing head is substantially one-half of the intermittent travel of the web.

5. Apparatus for producing a series of pockets in a textile fabric web formed of two fabric plies one overlying the other and connected along one longitudinal edge, comprising in combination: intermittent feed means for moving the web longitudinally, a pair of sewing heads mounted as a unit for reciprocating movement transversely of the web and adapted to form parallel lines of stitches defining sides of the pockets, a longitudinal sewing head mounted for linear reciprocating movement longitudinally of the web and adapted to form a straight line of longitudinal stitches closing the ends of the pockets, means for moving the pair of sewing heads to form the stitches transversely of the web when the web is stationary, and means for moving the said longitudinal sewing head in the direction of web movement when the web is moving and in the opposite direction when the web is stationary.

6. Apparatus for producing a series of fabric-pocketed spring coils from a textile web formed of two fabric plies one overlying the other and connected along one longitudinal edge, comprising in combination: a base, means on the base for inserting compressed coil springs between the fabric plies, intermittent feed means on the base for moving the web and springs longitudinally, at least one sewing head mounted on the base for reciprocating movement transversely of the web, and adapted to form lines of stitches between the coil springs defining sides of pockets for the coil springs, a second sewing head mounted on the base for linear reciprocating movement longitudinally of the web and adapted to form a straight line of longitudinal stitches closing the ends of the pockets about the coil springs, means for moving the first said sewing head when the web is stationary, and means for moving the second sewing head in the direction of web movement when the web is moving and in the opposite direction relative to the base when the web is stationary.

7. Apparatus for producing a series of pocketed spring coils from a web formed of two plies one overlying the other and connected along one longitudinal edge, comprising in combination: means for inserting compressed coil springs between the web plies, intermittent feed means for moving the web and springs longitudinally, at least one sewing head mounted for reciprocating movement transversely of the web and adapted to form lines of stitches between the coil springs defining sides of pockets for the coil springs, a second sewing head mounted for linear reciprocating movement longitudinally of the web and adapted to form a straight line of longitudinal stitches closing the ends of the pockets about the coil springs, means for moving the first said sewing head when the web is stationary, and means for moving the second sewing head when the web is stationary in a direction opposite to the travel of the web, and in the same direction as the web travel while the web is moving, but at a slower rate.

8. Apparatus for producing a series of pocketed spring coils from a web formed of two plies one overlying the other and connected along one longitudinal edge, comprising in combination: means for inserting compressed coil springs between the web plies, intermittent feed means for moving the web and spring longitudinally, at least one transverse sewing head mounted for reciprocating movement transversely of the web and adapted to form lines of stitches between the coil springs defining sides of pockets for the coil springs, a longitudinal sewing head mounted for linear reciprocating movement longitudindally of the web and adapted to form a straight line of longitudinal stitches closing the ends of the pockets about the coil springs, means for moving the transverse sewing head when the web is stationary, and means for reciprocating the said longitudinal sewing head so that when the web is stationary it moves opposite to the direction of web travel, and in the same direction as the web travel while the web is moving, but at a slower rate.

9. Apparatus for producing a series of fabric pocketed spring coils from a textile fabric web formed of two fabric plies one overlying the other and connected along one longitudinal edge, comprising in combination: means for inserting compressed coil springs between the fabric plies, intermittent feed means for moving the web and springs longitudinally, a pair of sewing heads mounted for reciprocating movement transversely of the web and adapted to form parallel lines of stitches between the coil springs defining sides of the pockets, the heads being spaced longitudinally of the web by an amount less than the extent of intermittent travel of the web, a longitudinal sewing head mounted for linear reciprocating movement longitudinally of the web and adapted to form a straight line of longitudinal stitches closing the ends of the pockets about the coil springs, means for moving the pair of sewing heads when the web is stationary, and means for moving the said longitudinal sewing head in the direction of web movement when the web is moving and in the opposite direction when the web is stationary.

References Cited in the file of this patent
UNITED STATES PATENTS

| | | |
|---|---|---|
| 1,813,993 | Gail | July 14, 1931 |
| 2,059,845 | Bowersox | Nov. 3, 1936 |
| 2,318,686 | Hathaway | May 11, 1943 |
| 2,771,045 | Cash | Nov. 20, 1956 |